United States Patent
Jensen et al.

(10) Patent No.: US 6,925,466 B2
(45) Date of Patent: Aug. 2, 2005

(54) ASYNCHRONOUS PROTOCOL FRAMEWORK

(75) Inventors: Peter Strarup Jensen, Fremont, CA (US); Pavel S. Veselov, Santa Clara, CA (US); Shivakumar S. Govindarajapuram, Santa Clara, CA (US); Shahriar Vaghar, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 683 days.

(21) Appl. No.: 10/104,297

(22) Filed: Mar. 22, 2002

(65) Prior Publication Data

US 2003/0182467 A1 Sep. 25, 2003

(51) Int. Cl.[7] .............................................. G06F 17/30
(52) U.S. Cl. ............................................. 707/10; 707/1
(58) Field of Search ............................... 707/1, 10, 100, 707/104.1; 709/201, 217, 218, 219, 220, 222, 223, 225; 711/147, 148; 717/168; 719/317; 715/501.1; 345/733

(56) References Cited

U.S. PATENT DOCUMENTS 6,574,716 B2 * 6/2003 Dovi ......................... 711/147
6,708,171 B1 * 3/2004 Waldo et al. ................. 707/10

OTHER PUBLICATIONS

Newton et al., WELD–An environment for Web–Based Electronic Design, DAC, 1998, pp. 146–151.*

* cited by examiner

Primary Examiner—Apu M. Mofiz
(74) Attorney, Agent, or Firm—Martine Penilla & Gencarella, LLP

(57) ABSTRACT

An invention is disclosed for providing an asynchronous protocol framework. A registry is provided having a plurality of proxies, wherein each proxy implements a generic interface for a related to a software component. In addition, each proxy is capable of providing specific messages to the related software component based on an underlying design structure of the software component, for example, EJB specific or JMS specific messages. A first proxy is obtained from the registry, wherein the first proxy is related to a first software component, a message is sent to the first software component using the generic interface of the first proxy. In particular, the first proxy sends a specific message to the first software component based on the underlying design structure of the first software component.

20 Claims, 7 Drawing Sheets

ASYNCHRONOUS PROTOCOL FRAMEWORK

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," (2) U.S. patent application Ser. No. 10/105,121 filed Mar. 22, 2002, and entitled "Arbitration of Communication Channel Bandwidth," (3) U.S. patent application Ser. No. 10/104,351 filed Mar. 22, 2002, and entitled "System and Method for Distributed Preference Data Services," (4) U.S. patent application Ser. No. 10/104,298, filed Mar. 22, 2002, and entitled "Business-Model Agnostic Service Deployment Management Service," (5) U.S. patent application Ser. No. 10/104,295, filed Mar. 22, 2002, and entitled "Manager Level Device/Service Arbitrator," (6) U.S. patent application Ser. No. 10/104,246, filed Mar. 22, 2002, and entitled "Java Telematics System Preferences," (7) U.S. patent application Ser. No. 10/104,243, filed Mar. 22, 2002, and entitled "System and Method for Testing Telematics Software," (8) U.S. patent application Ser. No. 10/104,860, filed Mar. 22, 2002, and entitled "System and Method for Simulating an Input to a Telematics System," (9) U.S. patent application Ser. No. 10/104,294, filed Mar. 22, 2002, and entitled "Java Telematics Emulator," and (10) U.S. patent application Ser. No. 10/104,245, filed Mar. 22, 2002, and entitled "Abstract User Interface Manager with Prioritization," which are incorporated herein be reference.

BACKGROUND OF THE INVENTION

1. Field of the Invention

This invention relates generally to telematic computer devices, and more particularly to abstract communication using an asynchronous protocol framework for tememnatic systems.

2. Description of the Related Art

Telematics refers to systems used for communications, instrumentation, control, and information technology in the field of transportation. Over the years, manufacturers of on-road vehicles, such as automobiles, vans, trucks, buses, and so on, have utilized computer technology to enhance the operations of existing features and functions in the vehicles as well as to provide new features and functions. For example, programmed controllers, custom-designed processors, embedded systems, and/or computer modules have been developed that support or even control various kinds of mechanical equipment in vehicles. For example, programmed controllers or computer modules have been developed that control or support various engine functions, such as fuel injection, timing, and so on. Programmed controllers or computer modules have been developed to enhance or support operation of transmission systems, suspension systems, braking systems, and so on. The sophistication of these enhancements has advanced as the processing power available for these purposes has increased. It is expected that in the future more aspects of the mechanical equipment in vehicles will be controlled or supported by processors or controllers in order to enhance performance, reliability, and safety, to reduce emissions, and so on.

Aside from using computer technology to support various mechanical functions in vehicles, processors, controllers, or other programmed computer-based technologies are used in vehicles in other ways. Car phones, entertainment equipment (such as CD players), in-vehicle navigation systems, and emergency roadside assistance systems are examples. In addition, new kinds of equipment that provide entirely new features may become available in vehicles. For example, vehicles may include radar systems that detect obstacles on the road ahead and then automatically brake the vehicle to prevent accidents. Another example is an in-vehicle email system that automatically downloads and reads the driver's email. These new kinds of equipment are likely to include one or more processors and appropriate programming.

These new kinds of equipment hold the promise of making the operation of a vehicle safer, more reliable, less polluting, and more enjoyable. However, there are several considerations related to providing these kinds of features that constrain implementation. One consideration relates to enabling the various in vehicle devices to communicate with a centralized location. In particular, different vehicle devices can communicate using different communication devices and protocols. Providing a mechanism to allow communication between these various protocols and protocols implemented on remote telematic servers can be a laborious endeavor.

In view of the foregoing, there is a need for a mechanism for abstracting protocols to facilitate communication with various vehicle client devices.

SUMMARY OF THE INVENTION

Broadly speaking, the present invention fills these needs by providing an asynchronous protocol framework mechanism that provides an abstract protocol for system components. In one embodiment, a method is disclosed for providing an asynchronous protocol framework. A registry is provided having a plurality of proxies, wherein each proxy implements a generic interface for a related to a software component. In addition, each proxy is capable of providing specific messages to the related software component based on an underlying design structure of the software component, for example, EJB specific or JMS specific messages. A first proxy is obtained from the registry, wherein the first proxy is related to a first software component, a message is sent to the first software component using the generic interface of the first proxy. In particular, the first proxy sends a specific message to the first software component based on the underlying design structure of the first software component.

An asynchronous protocol framework is also disclosed as an embodiment of the present invention. The asynchronous protocol framework includes a registry having a plurality of proxies, wherein each proxy implements a generic interface related to a software component. As above, each proxy is capable of providing specific messages to the related software component based on an underlying design structure of the software component. In addition, a first software component is included that has a first underlying design structure and a related first proxy in the registry. In this configuration, a second software component can send messages to the first software component using the first proxy.

A further asynchronous protocol framework is disclosed in a further embodiment of the present invention. The asynchronous protocol framework includes a registry having a plurality of proxies, wherein each proxy implements a generic interface related to a software component. As above, each proxy is capable of providing specific messages to the related software component based on an underlying design structure of the software component. Moreover, each proxy is identified using a naming convention including a domain, a type, and a session. A first software component having a first underlying design structure and a related first proxy in the registry is also included. As above, a second software component can send a message to the first software component using the first proxy. Further, the message can be routed to the first software component based on a domain, type, and session specified in the message. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an asynchronous protocol framework that provides an abstract protocol for system components. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
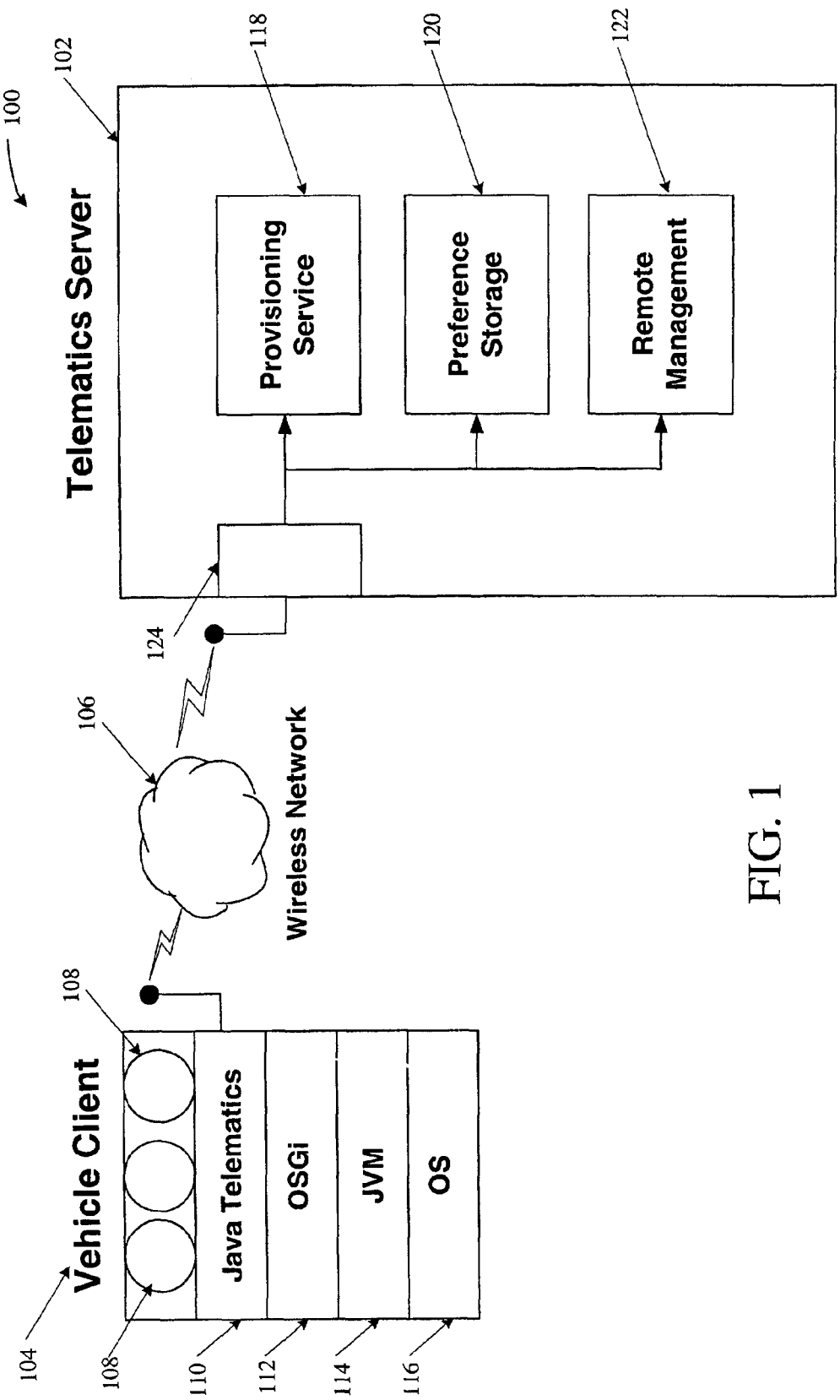
FIG. 1 is a diagram showing an exemplary wireless telematics system, in accordance with an embodiment of the present invention.

FIG. 1 is a diagram showing an exemplary wireless telematics system 100, in accordance with an embodiment of the present invention. As shown in FIG. 1, the wireless telematics system 100 includes a telematics server 102 in communication with a vehicle client 104 via a wireless network 106. The vehicle client 104 is generally implemented on a vehicle such as a car truck or van to provide enhanced functionality, such as navigation, entertainment, and communication. In one embodiment, the vehicle client 104 includes a plurality of carlets 108, which are individual software programs that provide specific functionality to the vehicle client 104. In addition, the vehicle client 104 generally includes a plurality of software layers, such as a Java telematics layer 110, an open services gateway initiative layer 112 (OSGi), a Java virtual machine layer 114, and an operating system 116.

The vehicle client 104 can be executed on a vehicle computing platform, which may include an interactive screen, global positioning satellite (GPS) system hardware, audio speakers, and microphone. In addition, the vehicle computing platform may include voice recognition software and speech generation capability. Further, the vehicle computing platform may be in communication with a vehicle bus, which allows communication with vehicle sensors to provide vehicle diagnostic information. As mentioned above, the vehicle client 104 can communicate wirelessly with the telematics server 102.

The telematics server 102 receives wireless communications using a communications application programming interface (API) framework 124. The communications API framework 124 provides a standardized framework for processing wireless communications independent of the actual physical networking hardware used for the wireless communications. In addition the communications API framework 124 allows communications with multiple networks, both wireless and non-wireless, such as the Internet.

Broadly speaking, the telematics server 102 includes provisioning service 118, preference storage 120, and remote management 122. The provisioning service 118 manages and provides the provisioning and downloading of carlets 108 to individual vehicle clients 104. In this manner the provisioning service 118 allows dynamic updating of the software functionality (i.e., carlets 108). For example, a user can subscribe to a particular service using a web page that is in communication with the telematics server 102. In response, the telematics server 102 can utilize the provisioning service 118 to deploy to the user's vehicle client 104, the carlets 108 associated with the particular service subscribed to by the user. When deploying carlets 108 to vehicle clients 104, embodiments of the present invention store user preferences using the preference storage 120.

Broadly speaking, the preference storage 120 is a storage of user preferences that can be made available to the computing platform executing the vehicle client 104. In addition, the vehicle client 104 can cache a portion of, or the entire contents of, the user's preference data stored in the preference storage 120. As above, a user may access the telematics server 102 via a web application to update their user preferences. Thereafter, the vehicle client 104 may request the updated user preferences from the preference storage 120. In this manner, a user can update their user preferences without having to utilize a limited vehicle computing platform interface.

The remote management 122 allows the telematics server 102 to manage the software and preferences on individual vehicle clients 104. For example, the remote management 122 can contact a vehicle client 104 and query information as to which carlets 108 are installed on the vehicle client 104. Further the remote management 122 can control the installing and uninstalling of applications and request vehicle status. In this manner, the telematics server 102 can remotely manage the vehicle clients 104.

Figure 2A:
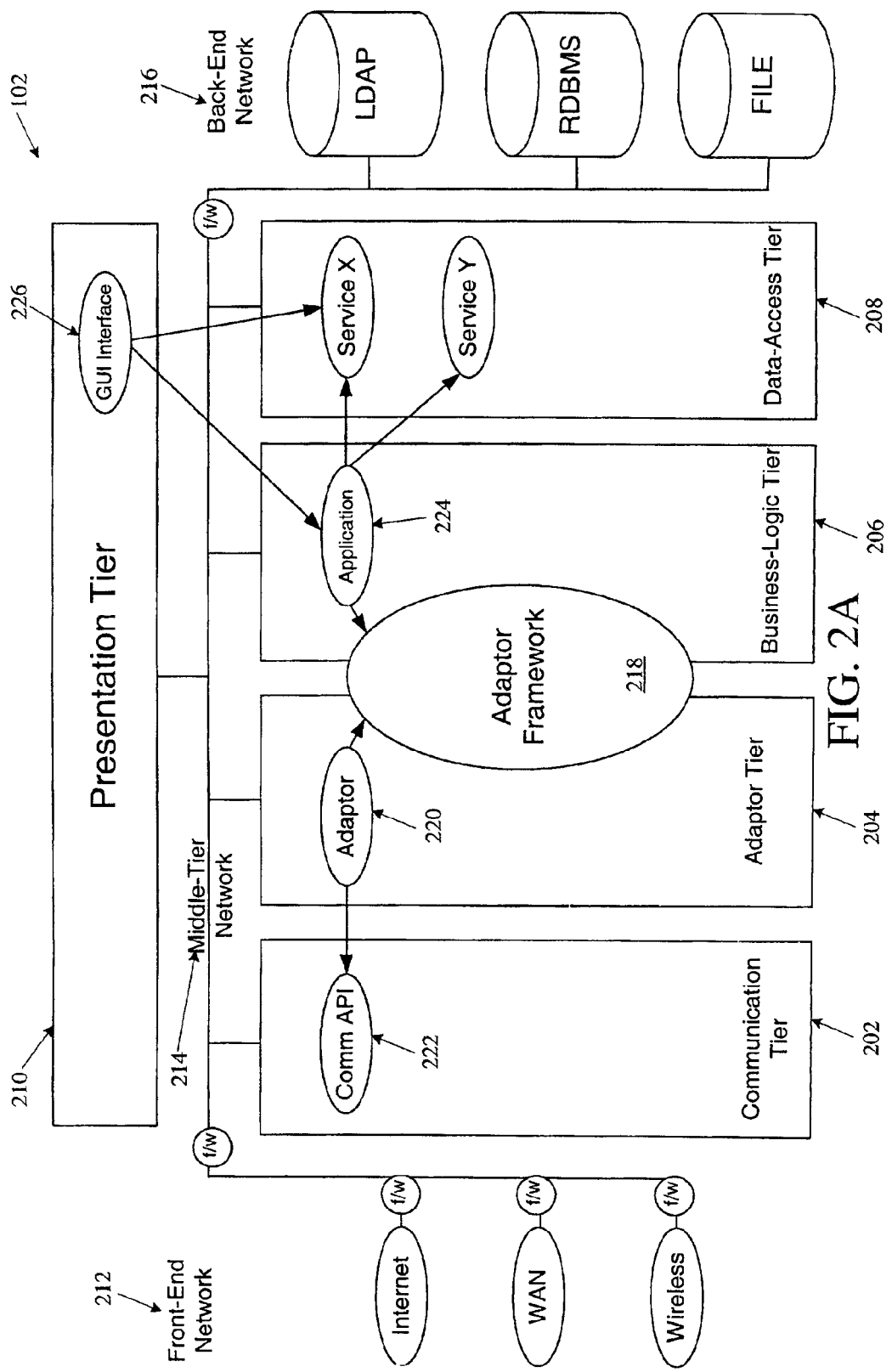
FIG. 2A is a functional diagram showing an exemplary telematic server, in accordance with an embodiment of the present invention.

FIG. 2A is a functional diagram showing an exemplary telematic server 200, in accordance with an embodiment of the present invention. The telematic server 200 generally is organized into five logical tiers, namely, the communication tier 202, the adaptor tier 204, the business-logic tier 206, the data-access tier 208, and the presentation tier 210.

FIG. 2A depicts the five logical tiers of the telematic server 102 and illustrates how the logical tiers relate to a typical network architecture, in this case comprised of three logical network-tiers: front-end network 212 (or DMZ), middle-tier network 214 (or application network), back-end network 216 (or information-systems network). It should be noted that FIG. 2A shows a logical network architecture. In a development environment, there can be only one physical network, while a deployment environment can include multiple physical networks separated by firewalls. For example, although the communication tier 202 is shown connected to both the front-end 212 and the middle-tier network 214, a physical machine is not required to be connected to both networks. The connection illustrates that the implementation of components in the communication tier 202 may be distributed across machines connected to either network.

The components depicted in FIG. 2A show the general model of how end-to-end applications or services are implemented in the telematic server 102. The client-side of the typical service is implemented by a service-bundle, which can be deployed to and executed on a vehicle client device. A service-bundle is an archive containing executable code (e.g. carlets), resources (e.g. images and error messages in appropriate languages), configuration and descriptive information. The vehicle client device communicates with the telematic server 102 through a deployment specific network, abstracted by communication APIs 222 in the communication tier 202. On the server-side, an adaptor 220 handles the application-level communication management (e.g. open, accept and close connections, send and receive data, etc.). Through the adaptor framework 218 the adaptor 220 is bound to an application component 224 implementing the server-side business-logic. The adaptor framework 218 allows adaptors 220 and applications 224 to be developed and deployed independently. Application components 224 are typically implemented using one or more generic services provided by the data-access tier 208.

In addition to any user interfaces provided by the client device, an end-to-end service may be accessible through other user interfaces 226, implemented in the presentation tier 210. This may include both applications for use by the service provider's employees or agents (e.g. client device administration, call centers, etc.), and customers (e.g. subscription management and other web services).

The communication tier 202 includes components implementing network protocols and interfaces. By using the APIs offered by communication tier 202, components in other tiers can communicate with remote vehicle client devices, as well as other types of clients, such as web-browsers. The communication tier 202 is connected to the front-end network 212 through which external networks (e.g. internet, wireless client network, etc.) are accessible. In addition, the communication tier 202 is connected to the middle-tier network 214, thus making the various communication APIs available to the other logical tiers.

In one embodiment, the communication tier 202 provides Intranet and Internet APIs, and telematic server communication APIs. The Intranet and Internet APIs can be provided by a general J2EE platform. Depending on the deployment, these APIs may or may not be available for communication with client devices. The telematic server communication APIs can be used to communicate with client devices supporting a compatible (interoperable) implementation of the corresponding client-side communication APIs, such as vehicle clients.

In order to abstract away from the specific communication mechanisms and application-level protocols employed by different types of client devices, the telematic server 102 defines a protocol API. The protocol API abstracts the generic application-level protocol that the telematic server 102 supports. In one embodiment, the protocol API includes a collection of request and reply handler interfaces. Handlers for incoming communications (requests and replies) are implemented by applications 224, while handlers for outgoing communications (requests and replies) are implemented by adaptors 220. For example, an application 224 may provide an interface that allows the application 224 to handle a client's request for a list of available services, while an adaptor 220 may provide an interface for sending such a list to a client.

Adaptors 220 provide client-specific application-level protocol management and communication. An adaptor 220 uses the communication APIs 222 offered by the communication tier 202 to communicate with individual vehicle client devices. In a simple case there is a one-to-one correspondence between the application-level protocol supported by the vehicle client and by the generic protocol reflected by the telematic server protocol API. That is, any communication received by an adaptor 220 will result in the invocation of a method on the interface of an appropriated application 224, and any invocation of a method on an adaptor API will result in a message being sent to a client device.

However, if the application-level protocol supported by the client doesn't match the telematic server protocol API, then the adaptor 220 is also responsible for mapping the client specific protocol to the telematic server protocol API. For example, a single request from a vehicle client device may require multiple requests to one or more applications 224.

The business-logic tier 206 includes components called applications 224. Applications 224 include the deployment specific business logic required to implement particular services. For example, a service discovery application may be responsible for calculating a reply when a client requests a list of available services. How to format the reply and how to send it is defined by a client specific protocol definition, and implemented by an adaptor 220. However, determining the content of the service list depends on the deployment's business rules. For example, the list could be pre-defined by the customer's service agreement, or the list might be calculated dynamically based on the vehicle client device's capabilities, or on other factors such as location.

In addition to the interface for handling incoming communications, an application 224 may provide a second interface, providing access to business functions. For example, a continuously running remote client management application may provide an interface for scheduling management activities, use an adaptor 220 to send directives to vehicle client devices at the scheduled time, and implement a reply handler interface allowing the adaptor 220 to deliver asynchronous replies.

The adaptor framework 218 supports, registration of adaptors 220 and applications 224, lookup of adaptors 220 and applications 224, binding between adaptors 220 and applications 224, and allowing adaptors 220 to pass strongly typed messages to appropriated applications 224 by invoking methods defined in the application interface, and vice versa.

The adaptor framework 218 allows an adaptor 220 to specify the appropriated application 224 (or vice versa), based on type, implementation and session. For example, a vehicle client specific service-discovery adaptor 220 may receive a request for a list of available services. After parsing and validating the request, the adaptor 220 tries to lookup a reference to a vehicle client (implementation) service-discovery (type) application to handle the request.

If any vehicle client service-discovery applications are registered with the adaptor framework 218, then the reference is bound to one of them (if there is more than one, the choice is implementation specific). If there are none, the adaptor framework 218 will attempt to bind to a default, client type neutral, service-discovery application. Assuming a suitable application is found, the adaptor 220 forwards the request to the application, passing along a reply address. If the client/server protocol uses asynchronous messaging, then the return address supplied by the adaptor may simply specify that the reply should go to any vehicle client service-discovery adaptor. But, if instead, the client/server protocol is based on synchronous communication, the adaptor creates a session and includes the session identifier in the return address, thus allowing the application to reply to the same adaptor. When the application is ready it uses the reply address in the request to lookup a reference to an adaptor and sends the reply.

The data-access tier 208 includes generic services for storing, managing and accessing deployment data. In general, a given service may be used by multiple applications 224, just as an application 224 may make use of multiple services. On one side the data-access tier 208 is connected to the middle-tier network 214, making services available to applications 224 in the business-logic tier 206, and to the presentation tier 210. On the other side, the data-access tier 208 connects to the back-end network 216 through which data storage systems (e.g. RDBMS, LDAP, file-servers, etc) are accessed, using existing J2EE APIs (e.g. JDBC, JNDI).

The presentation tier 210 includes various end-user interfaces available to the service provider's employees, agents or customers, through Internet or Intranet connectivity as appropriated. In addition to graphical user interfaces 226, the presentation tier 210 may include command-line utilities (scripts and programs) more appropriated for batch mode of operation (e.g. convert a existing customer database). Besides using various Internet and Intranet communication APIs, the components in the presentation tier 210 generally use the APIs of components in the data-access 208 and business-logic 206 tiers.

Figure 2B:
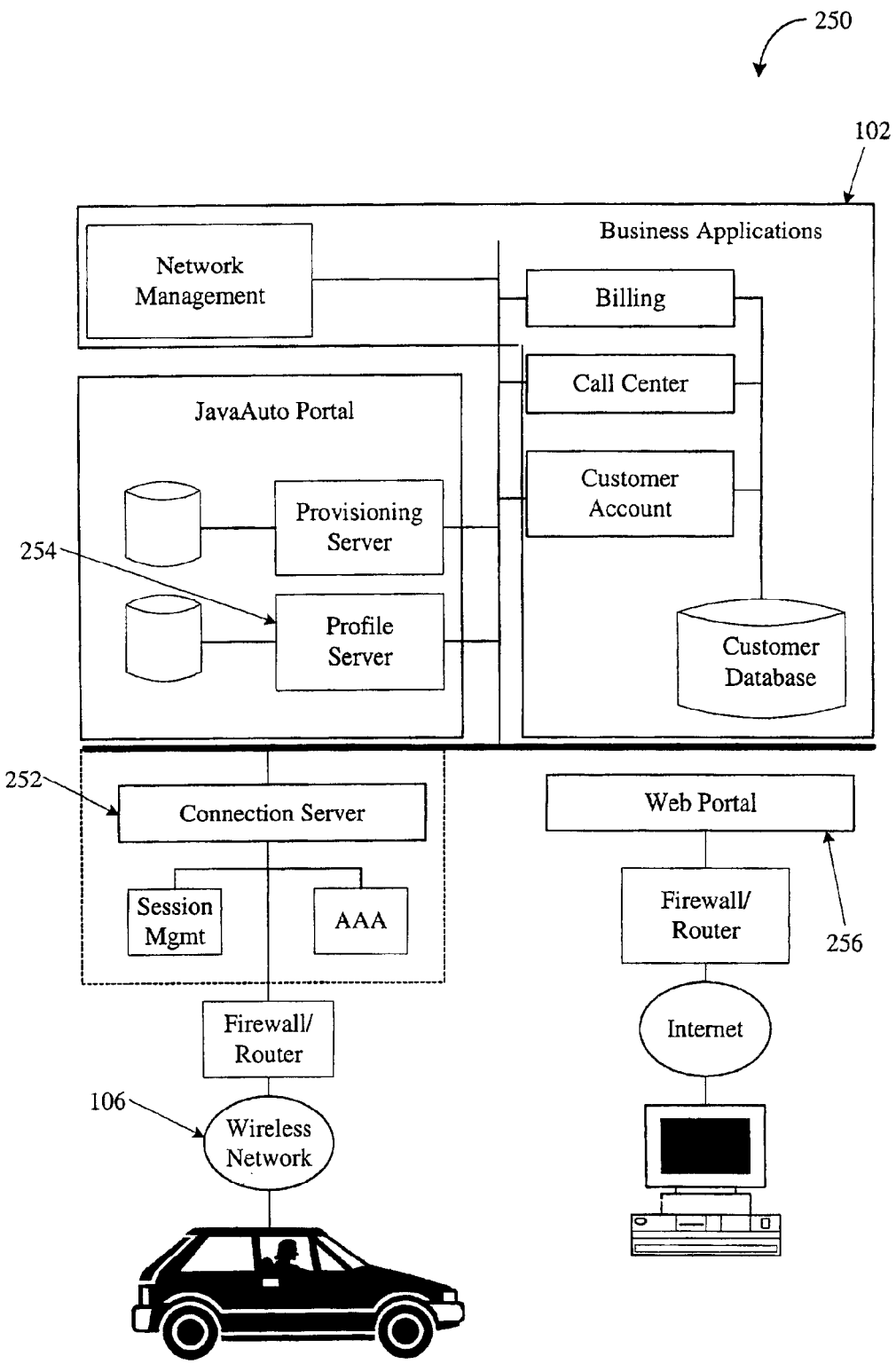
FIG. 2B is a block diagram an exemplary telematic server architecture, in accordance with an embodiment of the present invention.

FIG. 2B is a block diagram an exemplary telematic server architecture 250, in accordance with an embodiment of the present invention. The telematic server architecture 250 illustrates the interaction of components including the connection server 252 and the profile server 254, often accessed via a web portal 256.

The connection server 252 establishes, accepts, maintains, and terminates connections over the wireless network. In addition, the connection server 252 interacts with a security server to maintain secure end-to-end sessions. Further, the connection server 252 is responsible for both incoming and outgoing connections. The API for the telematic server 102 includes functions for making connections to vehicles. This includes support for both synchronous and asynchronous communication. Communication can be subject to prioritization, allowing the implementation to arbitrate limited network resources. Further, the telematic API masks the developer from the details of the actual network and carrier infrastructure.

Generic security can also be provided by the telematic server architecture 250. For example, security features can include authentication, authorization, encryption, and session management. For example, the communication system can be required to mutually authenticate the server and client devices, and only accept communication from authorized sources.

In addition, the communication system of the telematic server architecture 250 ensures data integrity and privacy. In addition, the system may provide application-level security features to allow a common notion of "users" inside the server (e.g., a customer logging into a web-portal) and on client devices (e.g., the driver of a vehicle identified by their ignition key, or otherwise).

The telematics server 102 manages a database in which all deployed (or deployable) services are stored. This database may also store information about client devices. The service repository supports dynamic characterization and categorization of services for different purposes (e.g., the service available to a particular device, the category of games, the set of services a given customer has subscribed to, etc.).

The telematics server 102 provides service APIs for controlling deployment of services to vehicles. More specifically the telematics server 102 supports service discovery, service subscription, and service delivery. Using service discovery, vehicle clients can query the telematics server 102 for lists of services based on service categories and matching criteria, to determine the set of services available to a given device. Using service subscription, telematics server 102 can support management of individual service categories (e.g., the set of services a given customer has subscribed to). Using service delivery, telematics server 102 allows vehicle client devices to download services (subject to authorization). This can involve downloading service implementation components or other resources from 3rd party service providers to a local cache. In addition, the telematics server 102 performs service version management, and provides APIs to remotely manage deployed services (e.g., start, stop, uninstall, upgrade, change configuration, etc.).

The profile server 254 manages a database containing users' preferences data. Thus, the profile server 254 allows clients to read and write user and service-specific preferences (subject to authorization). In addition, the profile server 254 provides an API allowing server-side access to preferences as well. For example, a user can log into a web-portal 256 and modify their personal radio station preferences, using a convenient web interface, and later find the updated preferences installed in their vehicle.

Figure 3:
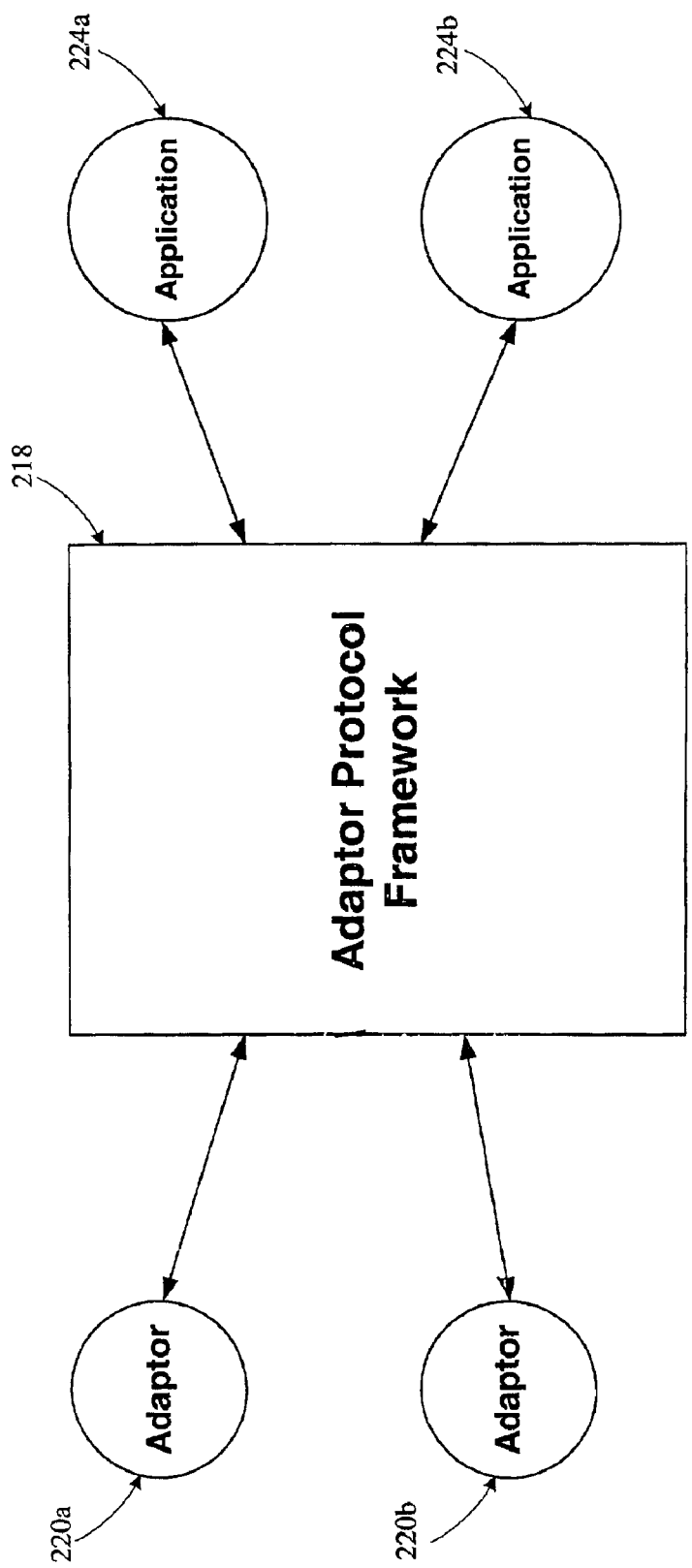
FIG. 3 is a block diagram showing an adaptor protocol framework, in accordance with an embodiment of the present invention.

As mentioned above, embodiments of the present invention support inter-component communication using asynchronous method invocation and dynamic binding based on domain, type, and session via an adaptor protocol framework 218. FIG. 3 is a block diagram showing an adaptor protocol framework 218, in accordance with an embodiment of the present invention. Broadly speaking, the adaptor protocol framework 218 provides a mechanism to abstract communication between the vehicle clients 104 and the telematic server 102. To this end, the adaptor protocol framework 218 is in communication with a plurality of adaptors 220a–220b and a plurality of applications 224a–224b, which include the actual business logic for the service. Although FIG. 3 shows only two adaptors 220a–220b and two applications 224a–224b, it should be borne in mind that any number of adaptors and applications can be included in the system.

In operation, the adaptors 220a and 220b are in communication with the vehicle client 104. The adaptors 220a and 220b adapt the specific client/server protocol to a generic protocol API. The application components 224a–224b implement the business logic for services. Using the adaptor protocol framework 218, the application components 224a–224b can be separated from the vehicle client specific communication and protocol issues, such as how to receive/send requests and responses, and how to format them. In this manner, fine-grain server-internal protocols can be mapped to multiple client specific client/server protocols, allowing the business logic to be shared while communicating with different types of vehicle client devices.

Generally, the application components 224a–224b are registered by names on the logical form domain, type, and session. The adaptors 220a–220b are then dynamically bound to the applications 224a–224b based on a matching algorithm for names. The binding mechanism allows addressing asynchronous invocations to appropriate components, for example, any component of a given type in a specific domain, such as a specific provisioning adaptor. In addition, the binding mechanism allows addressing asynchronous invocations to any appropriate component attached to a specific session, typically a precise instance, for example, an adaptor instance realized as a servlet. Although the invocation semantics are asynchronous, by attaching components to sessions it is possible to direct "reply"-invocations to specific components, and effectively realize synchronous communication patterns.

Figure 4:
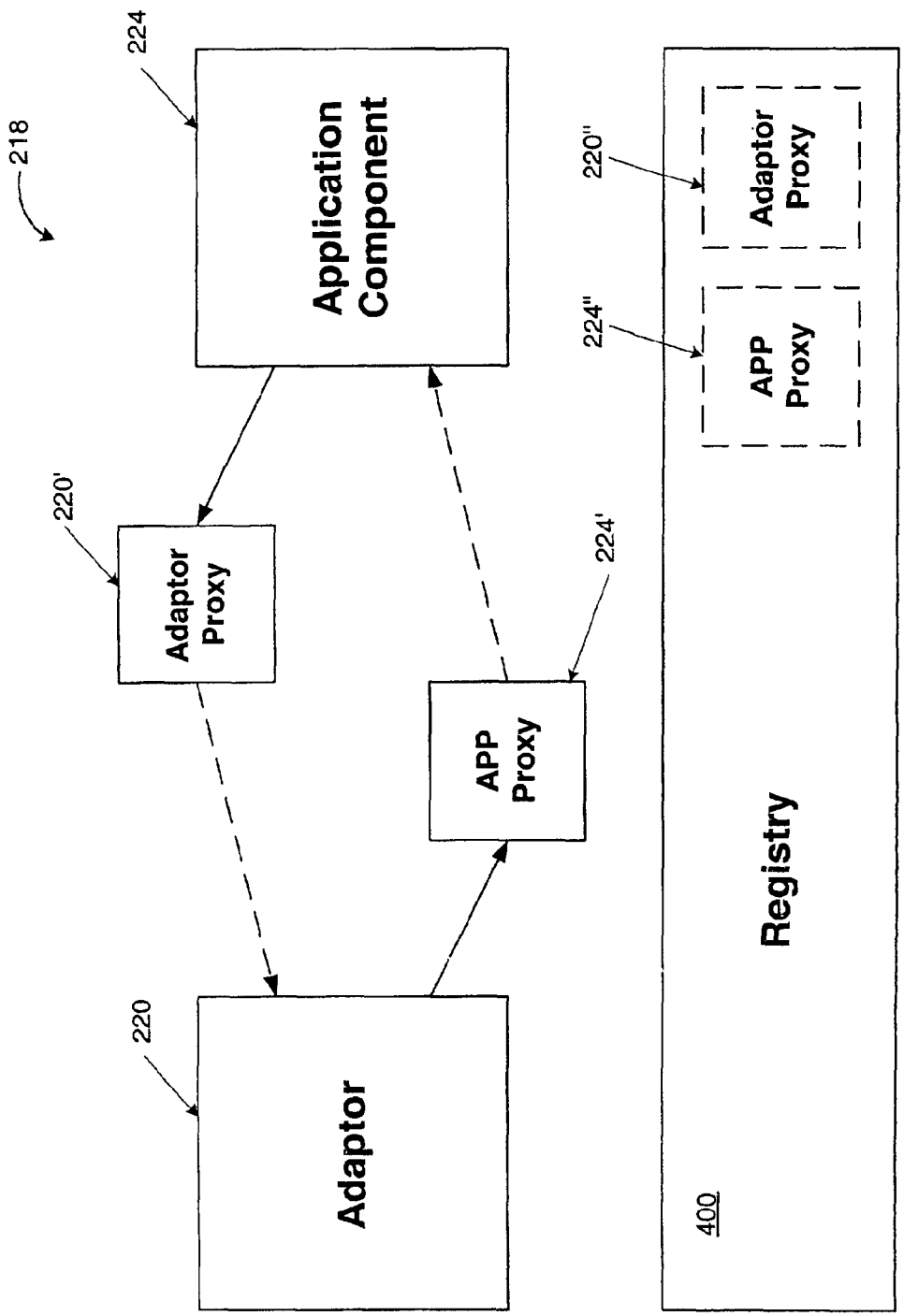
FIG. 4 is a block diagram showing an exemplary adaptor protocol framework using proxy communication, in accordance with an embodiment of the present invention.

FIG. 4 is a block diagram showing an exemplary adaptor protocol framework 218 using proxy communication, in accordance with an embodiment of the present invention. Broadly speaking, the adaptor protocol framework 218 abstracts communication between an adaptor 220 and an application component 224 using proxies. Each adaptor 220 and application component 224 is designed having an interface that does not imply the underlying structure of that component. That is, the interface generally does not imply whether the adaptor 220 or application component 224 is an Enterprise Java Bean (EJB), a Java Message Service (JMS) client, servlet, or other implementation. Thus, in one embodiment, the interface for each component is a pure Java interface, rather than an interface that extends an EJB or JMS client.

Embodiments of the present invention make the component interfaces available to other components to allow the components to invoke each other without knowing the underlying structure of the component. To perform this function, embodiments of the present invention utilize proxy objects that implement the interface of the their corresponding components. For example, application proxy 224' implements the interface of application component 224, and adaptor proxy 220' implements the interface of adaptor 220. Thus, once the adaptor 220 obtains access to the application proxy 224', the adaptor 220 can send asynchronous communications to the application component 224. In a similar manner, once the application component 224 obtains access to the adaptor proxy 220', the application component 224 can send asynchronous communications to the adaptor 220.

Once a proxy receives a request, the request is routed to a particular instance of the associated component. For example, when the adaptor 220 makes a request to the application proxy 224', the request is routed to a particular instance of the application component 224. In some cases, the actual component instance to which the request is routed is not important. However, to ensure the correct instance receives the request, a binding occurs between the proxy and the associated component.

Each proxy 220' and 224' is implemented based on the underlying structure of the associated component. For example, if the application component 224 is implemented as a JMS client, the application proxy 224' is implemented as a JMS client and sends JMS messages to the application component 224. If the application component 224 is implemented as an EJB, the application proxy 224' is implemented by looking up in a related container to obtain a reference to the EJB and making an invocation to find that actual instance of the application component 224. Hence, the design used for each proxy is based on the design chosen for the related component.

To provide access to the proxies, embodiments of the present invention implement a registry 400. Each component, such as the adaptor 220 and the application component 224, registers its proxies with the registry 400. Thus, the registry 400 includes a proxy definition 220" and 224" for each component, which can be later looked up by components needing to communicate with specific components. When a component requests a particular proxy definition, such as the application proxy definition 224", the registry provides a particular application proxy 224' instance to the requesting component. As mentioned above, to ensure proper routing of request information, embodiments of the present invention register proxies using a specific naming convention.

Figure 5:
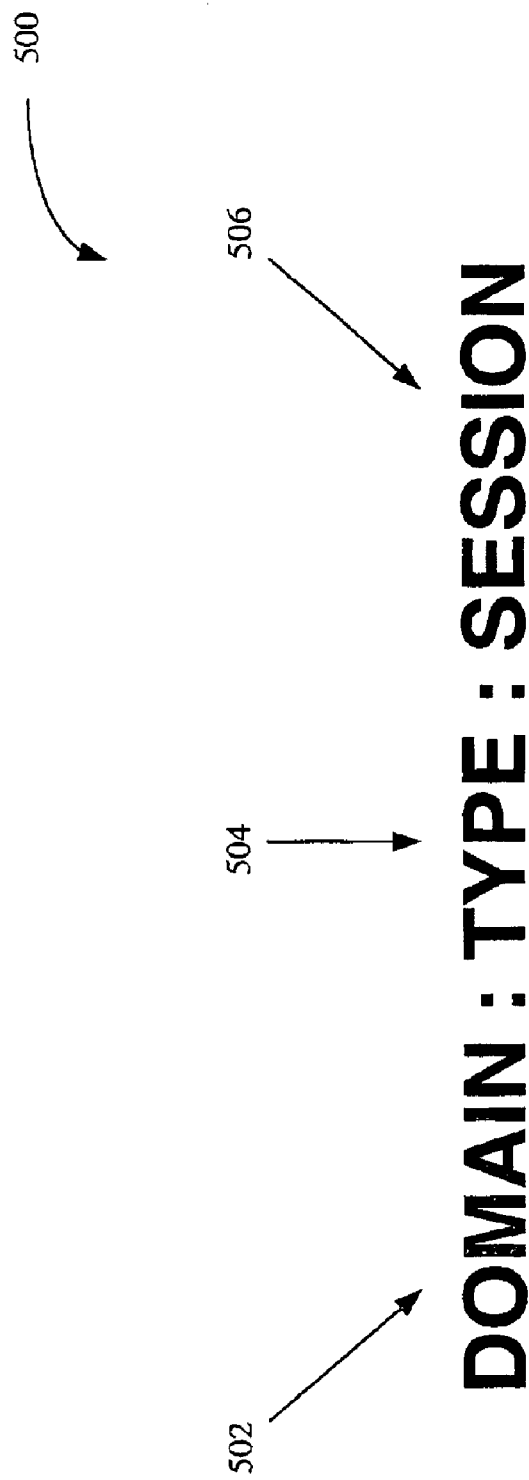
FIG. 5 is an illustration showing an exemplary proxy naming convention, in accordance with an embodiment of the present invention.

FIG. 5 is an illustration showing an exemplary proxy naming convention 500, in accordance with an embodiment of the present invention. In particular, the exemplary proxy naming convention 500 specifies a domain 502, a type 504, and a session 506 for each proxy. Domain 502 specifies the related component's purpose in the system. Generally, the domain 502 of a component is created to categorize the component within the system. For example, a component could be in the domain for a specific device. Type 504 specifies the interface type utilized for the component. That is, the type 504 specifies the interface implemented by a particular proxy. Session 506 identifies a particular instance of a component, however, in some embodiments the session 506 can be used to identify a plurality of instances.

Using the proxy naming convention 500, components can obtain proxies for components using varying specificity. For example, an adaptor can request a proxy for a component with no domain and having a particular interface type 504. In response, the registry provides any proxy matching the requested interface type 504 with a specific domain 502 or no domain. To be more specific, the adaptor can request a proxy for a component of a particular domain 502 and having a particular interface type 504 and a particular instance of component using session 506.

In addition, embodiments of the present invention can specify a reply address when invoking a message on the component. In this manner, the component being accessed can obtain the reply address to return responses to messages. Thus, the reply address can specify that any response to requests from a particular proxy be sent to the reply address, which may or may not be the address of the requesting component. As with the proxy naming convention 500, the reply address can be specified with varying specificity. For example, the reply address can specify a particular component instance to receive reply messages, or the reply address can specify any component of a particular domain to receive the reply messages.

Figure 6:
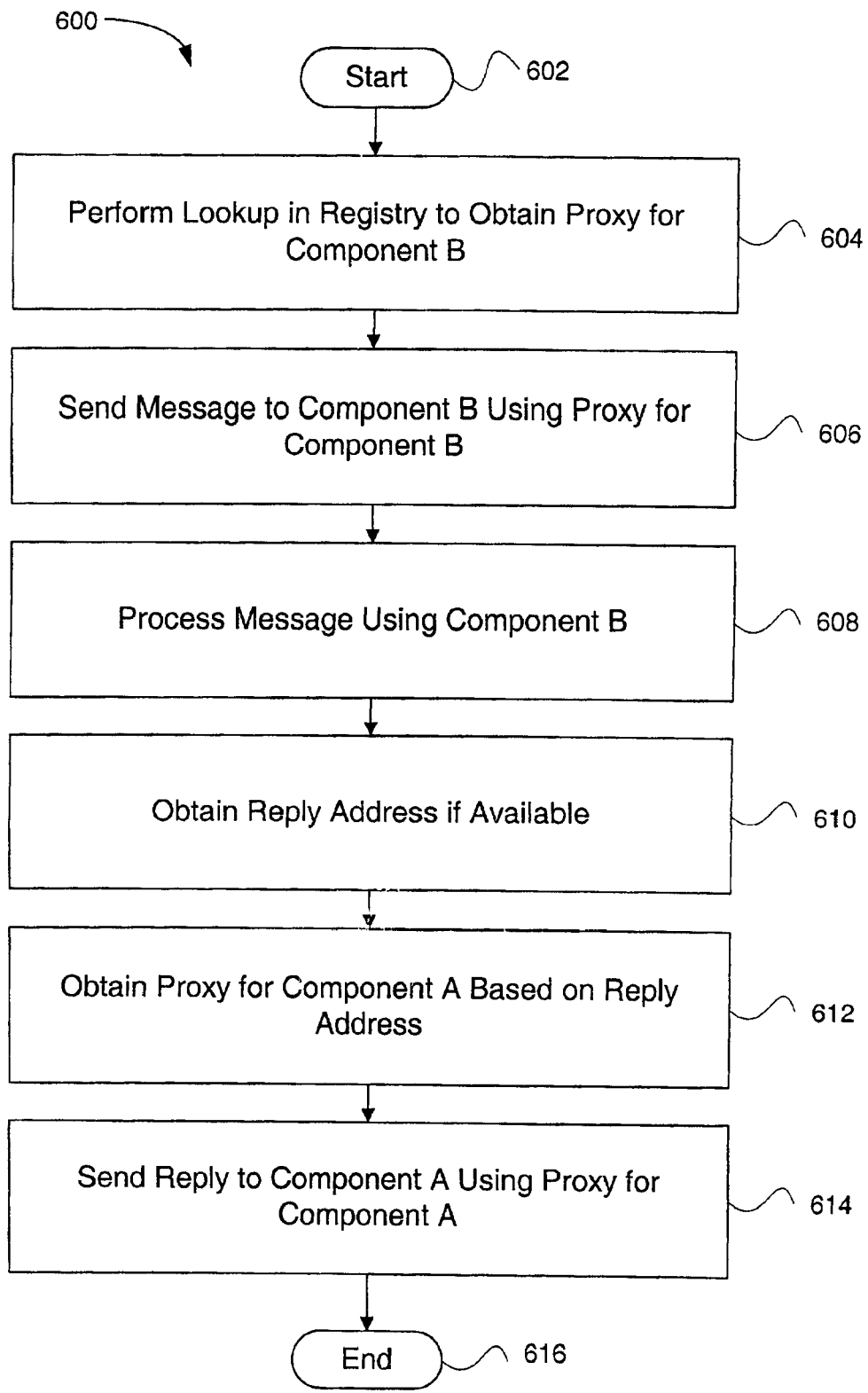
FIG. 6 is a flowchart showing a method for providing asynchronous communication, in accordance with an embodiment of the present invention.

FIG. 6 is a flowchart showing a method 600 for providing asynchronous communication, in accordance with an embodiment of the present invention. The method 600 illustrates asynchronous communication between two components, such as an adaptor and an application component. In particular, method 600 illustrates how a first component A sends a message to a second component B, and how component B replies to the message. In an initial operation 602, preprocess operations are performed. Preprocess operations can include registering a proxy for each component with a registry, naming the proxies, and other preprocess operations that will be apparent to those skilled in the art after a careful reading of the present disclosure.

In operation 604, component A performs a lookup operation using the registry to obtain a proxy for component B. To provide access to the proxies, embodiments of the present invention implement a registry. Each component, such as component A and component B, registers its proxies with the registry. Thus, the registry includes a proxy definition for each component, which can be later looked up by components needing to communicate with specific components. When component A requests a proxy definition for component B, the registry provides a proxy instance for component B to component A.

Component A sends a message to component B using the proxy for component B, in operation 606. Once the component B proxy receives a request from component A, the request is routed to a particular instance of component B. In some cases, the actual component instance to which the request is routed is not important. However, to ensure the correct instance receives the request, a binding occurs between the proxy and the associated component.

As mentioned previously, each proxy is implemented based on the underlying structure of the associated component. For example, if component B is implemented as a JMS client, the component B proxy is implemented as a JMS client and sends JMS messages to component B. If the component B is implemented as an EJB, the component B proxy can be implemented by looking up in a related container to obtain a reference to the EJB and making an invocation to find that actual instance of component B. Hence, the design used for each proxy is based on the design chosen for the related component.

Component B then processes the message in operation 608. As mentioned above, component B can be an application component. In this case, component B can implement business logic for a particular service. This business logic can then be utilized to process the message received via the component B proxy.

In operation 610, component B obtains the reply address associated with messages from the component B proxy. As mentioned above, embodiments of the present invention can specify a reply address when invoking a message on the component. In this manner, the component being accessed can obtain the reply address to return responses to messages. Thus, the reply address can specify that any response to requests from a particular proxy be sent to the reply address, which may or may not be the address of the requesting component. As with the proxy naming convention, the reply address can be specified with varying specificity. For example, the reply address can specify a particular component instance to receive reply messages, or the reply address can specify any component of a particular domain to receive the reply messages.

In operation 612, assuming the reply address relates to component A, component B performs a lookup operation using the registry to obtain a proxy for component A. Although method 600 is described in terms of the reply address referring to the invoking component, as noted previously, the reply address can specify addresses other than the requesting component for replies. Component B then sends a reply to component A using the proxy for component A, in operation 614. Post process operations are performed in operation 616. Post process operations can include further binding with other components, further proxy registration, component/proxy updating, and other post process operations that will be apparent to those skilled in the art after a careful reading of the present disclosure.

In one embodiment, the telematics system of the embodiments of the present invention can be implemented using the Java programming language. In general, developers design Java applications as hardware independent software modules, which are executed Java virtual machines. The Java virtual machine layer is developed to operate in conjunction with the native operating system of the particular hardware on which the vehicle clients and telematic server are to run. In this manner, Java applications can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet." Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing an asynchronous protocol framework, comprising the operations of:
   providing a registry having a plurality of proxies, each proxy implementing a generic interface for a related to a software component, each proxy capable of providing specific messages to the related software component based on an underlying design structure of the software component;
   obtaining a first proxy from the registry, the first proxy related to a first software component; and
   sending a message to the first software component using the generic interface of the first proxy, wherein the first proxy sends a specific message to the first software component based on the underlying design structure of the first software component.

2. A method as recited in claim 1, wherein each proxy is identified using a naming convention including a domain, a type, and a session.

3. A method as recited in claim 2, wherein the domain specifies a category of software components.

4. A method as recited in claim 2, wherein the type specifies an interface type provided by the associated proxy.

5. A method as recited in claim 4, wherein the session specifies a particular instance of a related software component.

6. A method as recited in claim 4, wherein the session specifies a plurality of instances of a related software component.

7. A method as recited in claim 1, further comprising the operation of associating a reply address with the first proxy, wherein the reply address specifies an address for replies related to the first proxy.

8. A method as recited in claim 7, wherein the first software component obtains a second proxy for a second software component using the reply address.

9. A method as recited in claim 8, wherein the first software component sends a reply to the second software component using the second proxy.

10. An asynchronous protocol framework, comprising:
    a registry having a plurality of proxies, each proxy implementing a generic interface for a related to a software component, each proxy capable of providing specific messages to the related software component based on an underlying design structure of the software component; and
    a first software component having a first underlying design structure and a related first proxy in the registry, wherein a second software component sends messages to the first software component using the first proxy.

11. An asynchronous protocol framework as recited in claim 10, further including a reply address associated with first proxy, the reply address indicating an address for reply messages related to the first proxy.

12. An asynchronous protocol framework as recited in claim 11, the first software component obtains a second proxy for the second software component from the registry.

13. An asynchronous protocol framework as recited in claim 12, wherein the first software component sends messages to the second software component using the second proxy.

14. An asynchronous protocol framework as recited in claim 13, wherein each proxy is identified using a naming convention including a domain, a type, and a session.

15. An asynchronous protocol framework, comprising:
    a registry having a plurality of proxies, each proxy implementing a generic interface for a related to a software component, each proxy capable of providing specific messages to the related software component based on an underlying design structure of the software component, each proxy is identified using a naming convention including a domain, a type, and a session; and
    a first software component having a first underlying design structure and a related first proxy in the registry, wherein a second software component sends a message to the first software component using the first proxy, and wherein the message is routed to the first software component based on a domain, type, and session specified in the message.

16. An asynchronous protocol framework in claim 15, wherein the domain specifies a category of software components.

17. An asynchronous protocol framework as recited in claim 16, wherein the type specifies an interface type provided by the associated proxy.

18. An asynchronous protocol framework as recited in claim 17, wherein the session specifies a particular instance of a related software component.

19. An asynchronous protocol framework as recited in claim 17, wherein the session specifies a plurality of instances of a related software component.

20. An asynchronous protocol framework as recited in claim 15, wherein a reply address is associated with each proxy, the reply address indicating an address for reply messages related to the proxy.

* * * * *